(12) United States Patent
Brainard

(10) Patent No.: US 10,627,254 B2
(45) Date of Patent: Apr. 21, 2020

(54) LOW INTERFERENCE SUB-METER AND MONITORING SYSTEM

(71) Applicant: F.S. Brainard & Company, Burlington, NJ (US)

(72) Inventor: Brad Brainard, Hinesburg, VT (US)

(73) Assignee: F.S. Brainard & Co., Burlington, NJ (US)

( * ) Notice: Subject to any disclaimer, the term of this patent is extended or adjusted under 35 U.S.C. 154(b) by 0 days.

(21) Appl. No.: 16/208,894

(22) Filed: Dec. 4, 2018

(65) Prior Publication Data
US 2019/0310107 A1 Oct. 10, 2019

Related U.S. Application Data

(60) Provisional application No. 62/652,344, filed on Apr. 4, 2018.

(30) Foreign Application Priority Data

Apr. 26, 2018 (CA) ...................... 3003044

(51) Int. Cl.
*H04Q 9/00* (2006.01)
*G01D 4/00* (2006.01)
*G06Q 50/06* (2012.01)

(52) U.S. Cl.
CPC ............. *G01D 4/008* (2013.01); *G01D 4/004* (2013.01); *G06Q 50/06* (2013.01)

(58) Field of Classification Search
CPC ......... G01D 4/008; G01D 4/004; G06Q 50/06
See application file for complete search history.

(56) References Cited

U.S. PATENT DOCUMENTS

| | | |
|---|---|---|
| 4,804,957 A | 2/1989 | Selph et al. |
| 6,137,423 A | 10/2000 | Glorioso et al. |
| 6,333,975 B1 | 12/2001 | Brunn et al. |
| 6,424,270 B1 | 7/2002 | Mohammed |
| 6,577,245 B2 | 6/2003 | Hammond |
| 6,657,552 B2 | 12/2003 | Belski et al. |
| 6,985,087 B2 | 1/2006 | Soliman |
| 7,669,461 B2 | 3/2010 | Kates |
| 7,688,220 B2 | 3/2010 | Bovankovich et al. |
| 7,797,009 B2 | 9/2010 | Kiiskila et al. |

(Continued)

OTHER PUBLICATIONS

"Notice of Allowance", related to Canadian Application No. 3,003,044, dated Nov. 19, 2018.
Muhendra, et al., "Development of digital water meter infrastructure using wireless sensor networks", AIP Conference Proceedings 1746, No. 1 (2016); https://doi.org/10.1063/1.4953950, 2016.
Neptune, "Neptune Collaborates with Sensus, Itron, and Elster to Provide Compatibility with the Industry Leading E-Coder", available at: https://www.neptunetg.com/resources/press-releases/neptune-collaborates-with-sensus-itron-and-elster-to-provide-compatibility-with-the-industry-leading-e-coded, Sep. 24, 2010.

(Continued)

*Primary Examiner* — Amine Benlagsir
(74) *Attorney, Agent, or Firm* — Shawn Gordon; Dunkiel Saunders Elliott Raubvogel & Hand, PLLC

(57) ABSTRACT

Embodiments of the present disclosure allow third-parties to collect data at a utility flow meter without substantial interference with the utility's ability to collect data for its own purposes. In an exemplary embodiment, a sub-meter interrupter is included that has a default position to allow for utility reading of a utility flow meter and a second position that allows for third-party reading of the utility flow meter. A third-party flow monitor or interrupter can also monitor attempted "reads" by the utility while the third-party flow monitor is reading the utility flow meter and can switch to the default (e.g., utility read setting) so as to allow the utility to conduct its read.

22 Claims, 5 Drawing Sheets

(56) References Cited

U.S. PATENT DOCUMENTS

| | | | |
|---|---|---|---|
| 8,103,390 B2 | 1/2012 | Rodgers | |
| 8,219,214 B1 | 7/2012 | Mimlitz | |
| 8,378,848 B2 | 2/2013 | Young et al. | |
| 8,448,845 B2 | 5/2013 | Winter et al. | |
| 8,941,509 B2 | 1/2015 | Ching et al. | |
| 9,030,329 B2 | 5/2015 | Rutherford et al. | |
| 9,129,517 B2 | 9/2015 | Liu et al. | |
| 9,330,563 B2 | 5/2016 | Rhoads et al. | |
| 9,523,587 B2 | 12/2016 | Labate et al. | |
| 2002/0161536 A1 | 10/2002 | Suh et al. | |
| 2012/0094633 A1* | 4/2012 | Parsons | H04L 63/101 455/411 |
| 2015/0128283 A1* | 5/2015 | Mashima | G06Q 10/10 726/26 |

OTHER PUBLICATIONS

Sudin, et al., "Digital Household Energy Meter", Proceedings of EnCon2008, 2nd Engineering Conference on Sustainable Engineering Infrastructures Development & Management, Dec. 18, 2008.

"Notice of Allowance", related to Canadian Application No. 3,003,044, Canadian Intellectual Property Office, dated Nov. 19, 2018.

McCabe, Justin, "Response to Office Action", related to Canadian Application No. 3,003,044, Canadian Intellectual Property Office, dated Oct. 30, 2018.

Francois, Ziade, "First Office Action", related to Canadian Application No. 3,003,044, Canadian Intellectual Property Office, dated Jul. 31, 2018.

* cited by examiner

LOW INTERFERENCE SUB-METER AND MONITORING SYSTEM

RELATED APPLICATIONS INFORMATION

This application claims priority to Canadian Application No. 3,003,044, filed Apr. 26, 2018 and titled "Low Interference Sub-Meter and Monitoring System", which claims priority to U.S. Provisional Application No. 62/652,344, filed Apr. 4, 2018, and titled "Low Interference Sub-Meter and Monitoring System", each of which are incorporated by reference in their entireties.

FIELD OF INVENTION

The present invention generally relates to flow meters. In particular, the present invention is directed to a Low Interference Sub-Meter and Monitoring System.

BACKGROUND

As is well known, utility industries (such as gas and water utilities) typically install a meter to indicate consumption of the relevant commodity by a particular customer. The consumption indicated by the meter forms the basis of the bill sent to the customer each month (or over another predetermined period of time). To read consumption from the meter, the utility industries have often utilized personnel whose job has been to physically inspect meters at each customer location. In order to reduce the need for meter-reading personnel to inspect every meter, many utilities have begun using various automatic meter reading (AMR) and remote meter reading (RMR) systems. These systems simplify the meter-reading process, by reading usage information from the individual meters through data transmissions. Toward this end, a meter typically includes a meter interface unit (MIU) that controls transmission of usage information read from the meter. At a predetermined scheduled time or upon receipt of an electronic request, the MIU will send the usage information, typically using one of three proprietary codecs, to the utility in the utility's desired format.

Utility flow meter operation must be reliable and accurate for appropriate utility monitoring and billing. Regarding accuracy, an important component of a utility flow meter is its encoder that translates the meter's behavior into the transmittable consumption reading sent by the MIU on which a utility customer's bill is based. As such, in the development and design of utility flow meters, encoder accuracy is an important factor.

Utilities either actually or constructively own flow meters, meaning that even when a customer has paid for the meter, such as a water meter, the meter is still effectively owned and controlled by the utility. While utilities have access to the data and information collected by it, other interested parties generally do not. Thus, for example, a facility may not have access to the granular data they would like to have, even though the utility does have access to such data. However, meter owners (i.e., utilities) have been reluctant to allow others to intervene with or splice into their data capture operations in view of the importance of accuracy discussed above.

BRIEF SUMMARY

In a first aspect, a sub-meter monitoring system for a utility flow meter connected to a utility via a utility meter interface unit is described, the sub-meter monitoring system comprising: a flow monitor that receives data from the utility flow meter, and an interrupter in electronic communication with the utility flow meter, the utility meter interface unit, and the flow monitor, the interrupter operable to move between first state and a second state, wherein the first state directly connects the utility flow meter with the utility meter interface unit and wherein the second state electronically couples the utility flow meter directly with the flow monitor; and wherein the flow monitor is configured to monitor whether a read request is coming from the utility and to operate the interrupter such that: if the utility is reading the utility flow meter or is about to read the utility flow meter, the interrupter remains in the first state, and if the utility is not reading and is not about to read the utility flow meter, the interrupter is switched to the second state so as to allow a utility flow meter reading by the flow monitor and after the flow monitor reading is complete, the interrupter is switched back to the first state.

In another aspect an interrupter for a sub-meter monitoring system is described, the sub-meter monitoring system including a flow monitor capable of receiving data from a utility flow meter connected to a utility via a utility meter interface unit, the interrupter comprising: a receiver in electronic communication with the flow monitor; a switch in electronic communication with the receiver, the switch being operable to change between a first state and a second state, wherein the first state directly connects the utility flow meter with the utility meter interface unit and wherein the second state electronically couples the utility flow meter with the flow monitor; wherein the receiver is configured to: receive a read request from the flow monitor; and alter the state of the switch based upon the read request so as to electronically couple the utility flow meter with the flow monitor.

In yet another aspect, a method of reading a utility flow meter by a third-party flow monitor comprises: sending a data request to an interrupter; switching the interrupter from a first state to a second state thereby allowing for electronic communications between the utility flow meter and the third-party flow monitor; and receiving data, the data representative of a liquid flow volume and/or rate, from the utility flow meter.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
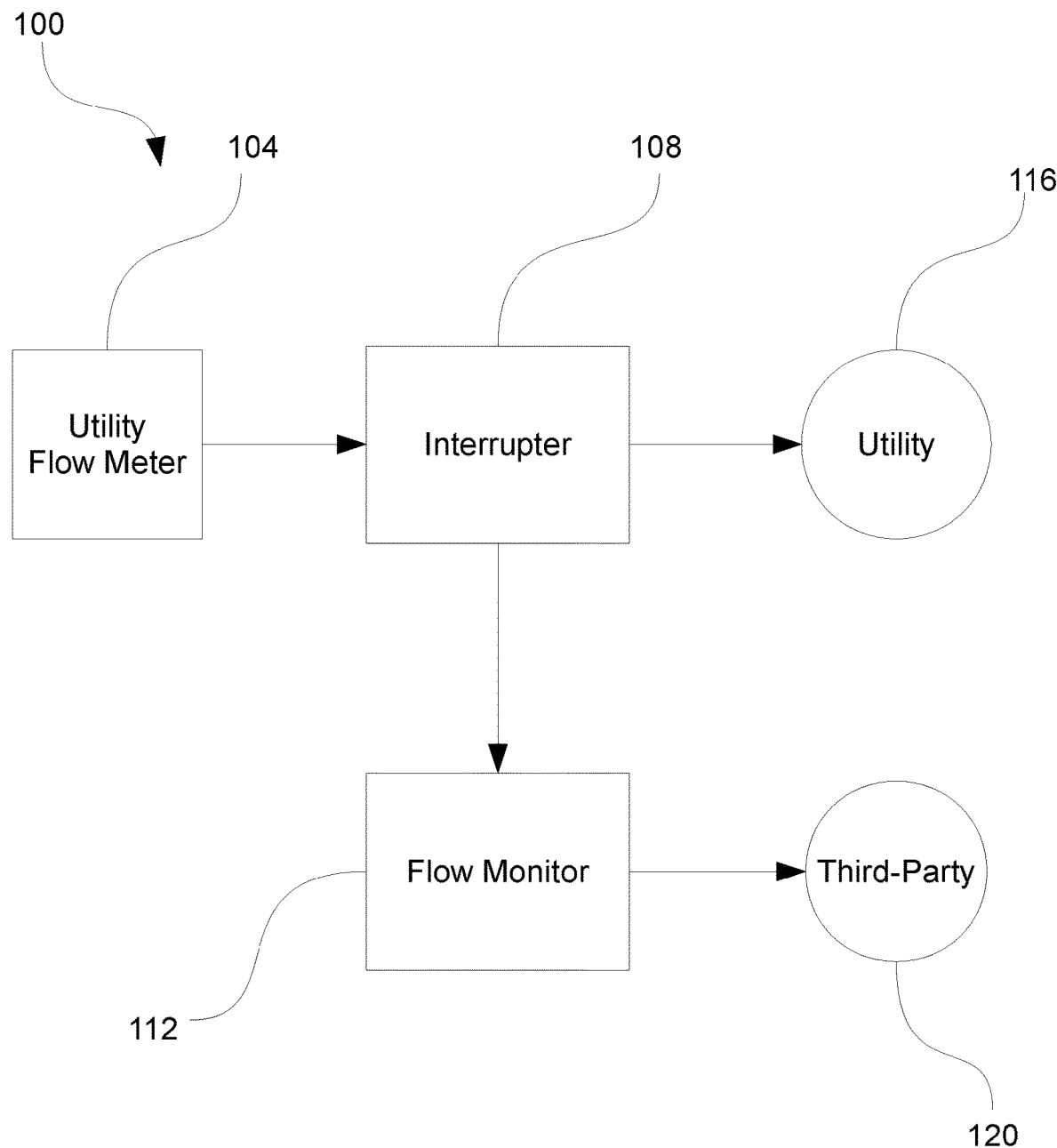
FIG. 1 is a block diagram of an exemplary low interference sub-meter monitoring system according to an embodiment of the present disclosure.

A low interference sub-meter according to embodiments of the present disclosure allows third-parties to collect data at a utility flow meter without substantial interference with the utility's ability to collect data for its own purposes. Certain embodiments of the low interference sub-meter disclosed herein place a sub-meter "switch" to a position where the utility's ability to read the meter is the default. Certain embodiments of the low interference sub-meter monitor "read" attempts by the utility while the low interference sub-meter is reading the meter and switch to the default (e.g., utility read setting) so as to allow the utility to conduct its read. Certain embodiments of the low interference sub-meter are capable of reading several utility flow meters, even meters using different proprietary codecs. In certain embodiments, the low interference sub-meter completes its read, despite the utility request to read the meter, before switching back to allow the utility to read the meter.

Turning first to a general discussion of a typical meter, at a high level, a utility flow meter (also referred to herein as "meter") includes a communications device and features protocol that allows for monitoring of customer usage data. The meter measures and records volumetric usage of a material, e.g., water or gas (propane, fuel oil, etc.), as it passes through the meter. These meters are also used in industrial applications to measure the flowrates of various components. The meter discussed below is best described as a self-powered water meter; however, it should be understood that the low interference sub-meter can be applied to many different types of meters in a wide variety of applications.

A typical electronic water metering system includes one or more electronic water meters for an individual customer. The meter or meters are typically located at a point on the individual customer's supply line between the customer and utility's main supply line. A meter interface unit is an electronic device that reads meter usage data from an electronic register and transmits the data to a local transmitter/receiver via radio or other types of signals or to a local reading device or both. Typically, the number of MIUs is equal to the number of meters employed at the site. The MIU can take on other forms (e.g., laptop computer), or it could be integrated with the meter.

Some newer meter systems also include a transmitter/receiver (handheld units, automobile mounted, etc.) that allows utility personnel to receive usage data without manually reading each individual meter. Instead, when each transmitter/receiver is within range of a meter, data from the meter is transmitted to the transmitter/receiver, which, in turn, transmits it to the utility system. Alternatively, some meter systems transmit the data via a fixed base network. The utility's software system can then calculate the usage of each customer based on the data and bill each customer for their usage.

In some cases, electronic water meters can be self-powered by an internal "Wiegand Wire". The Wiegand Wire is a device that generates electrical signals when it is exposed to a magnetic field with changing polarity. The wire may also be used to induce voltage across a coil located near the wire. The polarity of the magnetic field is changed by relying on the kinetic energy of the fluid moving through the meter. In some implementations, the fluid turns an internal water wheel that in turn rotates an attached shaft as it moves through the meter. Multiple magnets are arranged on a circular disc that is attached to the rotating shaft. As the circular disc rotates along with the shaft, the movement of the magnets induces alternating fields of magnetic flux within the Wiegand Wire that is located in close proximity to the disc. The signals generated by the wire due to the changes in the magnetic flux are used to power the electronic circuits that monitor the meter. The rate, volume, and direction of fluid flow through the meter may also be determined by analyzing the number and rate of signals generated by the wire.

Generally, a water meter is connected to a water supply line on the water customer's inflow line. Water flows from the utility supply line through the inflow line into the meter body and out through the meter outflow to the customer. As the water flows through the meter, it typically forces an internal flow wheel or disc to revolve or nutate, which in turn rotates a circular magnetic disc that is connected to the flow wheel or a disc.

As the wheel or disc rotates it changes the magnetic flux polarity, thereby creating signals that are generated by the Wiegand Wire that is located adjacent to the disc. These signals represent data concerning the water flow through the meter and also provide power to the electronic circuits of the meter. Specifically, the stream of signals corresponds to the rate and direction of the water flow through the meter. The flowrate of the water through the meter is typically calibrated to the rate of rotation of the flow wheel, the disc, and the signal stream generated by the Wiegand Wire.

The generated signals are processed and stored in a circuit that is integral to the meter. These circuits typically contain an ASIC (Application Specific Integrated Circuit) chip that processes the signal from the Wiegand Wire using the energy contained within the signal. In some meters, a non-volatile memory is located within the ASIC, which serves to store the data. An external power supply line is used by the host to access the data stored in the non-volatile memory embedded in the ASIC (as mentioned, via an encrypted protocol). Other connections for the ASIC can include, but are not limited to: an enable signal, a data signal, a clock signal, and an output signal. Each of these connections passes through a host interface to the meter's internal data storage.

The clock signal is a steady stream of timing signals that synchronize communication operations of the data system. In some cases, the meter's internal circuitry calculates usage data in about 15-minute intervals, which results in 96 data readings per 24-hour period, although more or fewer readings are also known. The initialization signal serves to activate the host (utility) to receive, process and store the data from the meter.

Turning now to FIG. 1, there is shown an exemplary low interference sub-meter monitoring system 100. In this embodiment, monitoring system 100 includes a utility flow meter 104, an interrupter 108, and flow monitor 112. Utility flow meter 104 can be similar to the meter described above or can be most any utility flow meter. Preferably utility flow meter 104 employs Sensus® (Sensus USA Inc. of Raleigh, N.C.), Neptune® (Neptune Technology Group Inc. of Tallassee, Ala.), or Elster® (Elster Group GMBH of Germany) encoder protocols. Utility flow meter 104, typically via the ASIC or the meter's internal circuitry, is electronically coupled to the interrupter 108, which in turn is in electronic communication with the utility 116 and with a third-party 120 (via flow monitor 112) such that either entity can request a "read" of the meter.

Interrupter 108 operates as a gatekeeper for the entity that retrieves data from the meter. In an exemplary embodiment, interrupter 108 is capable of switching between two different states. The first state is a facilitation of a direct connection between utility flow meter 104 and the utility 116, thereby allowing the utility to retrieve data directly from the meter. For the purposes of this disclosure, the terms "direct" and "directly" and phrases "direct connection" or "directly connected" mean a connection that has electrical continuity such that the connection between two devices or a device and an entity, such as a utility, is unbroken even in the event of a catastrophic event, e.g., power outage or flow monitor failure. The second state is a facilitation of a connection between utility flow meter 104 and third-party 120 via flow monitor 112. In an exemplary embodiment, the first state is an "always on, unless" state—meaning, that unless a third-party request for data is coming from flow monitor 112, interrupter 108 is in the first state. In this embodiment, the second state occurs if, and only if, there is a request from third-party 120. In this way, if there is a power failure or other malfunction with interrupter 108 or flow monitor 112, the utility will continue to have the ability to read the meter because the default state (the first state) is characterized by a direct electronic connection between utility flow meter 104 and utility 116.

Figure 5:
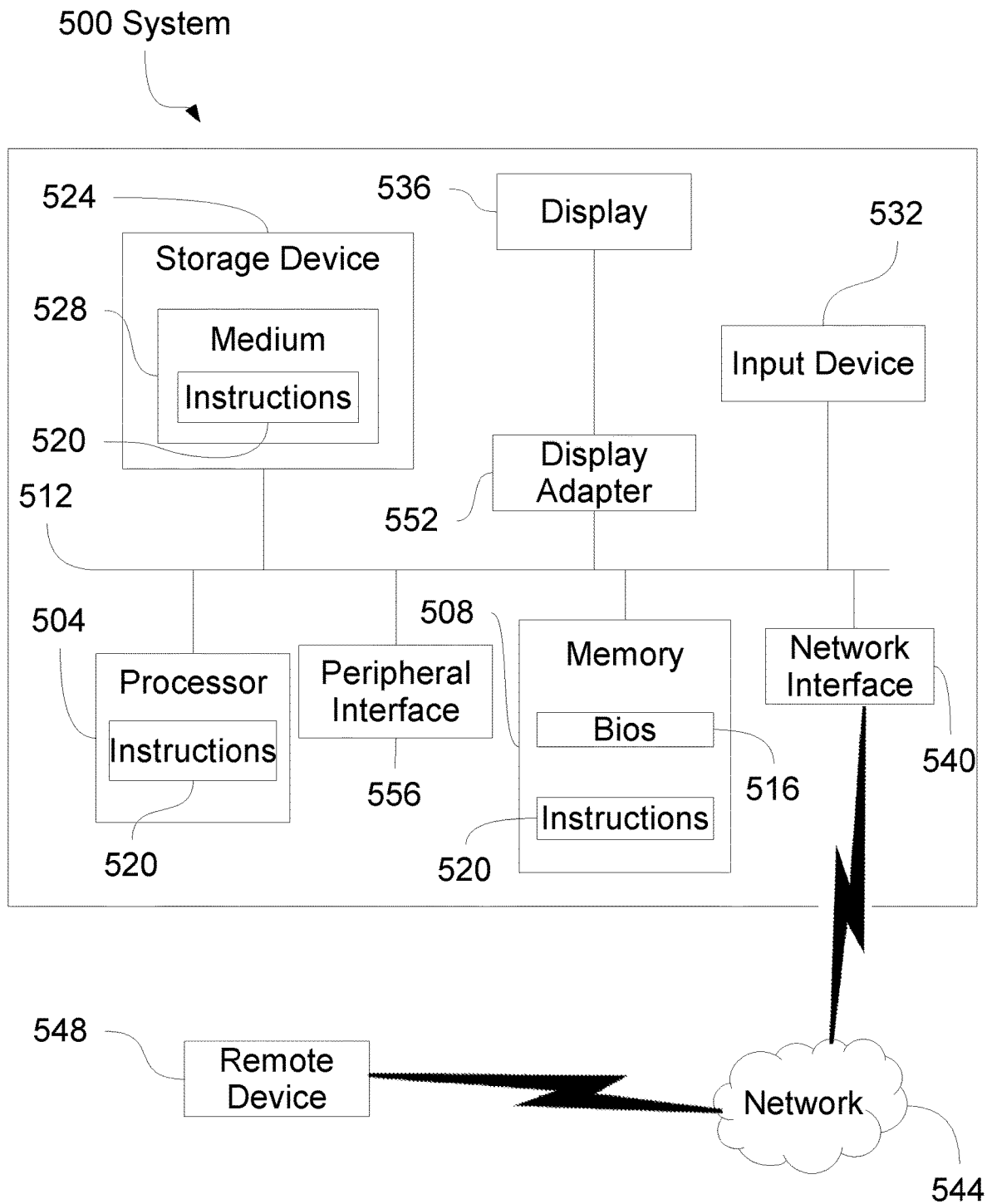
FIG. 5 is a block diagram of a computing system suitable for one or more of the embodiments and processes described in the present disclosure.

In another embodiment of interrupter 108, the interrupter includes a microprocessor, such as processor 504 (FIG. 5) and a memory 508 (FIG. 5). Memory 508 includes a set of instructions 520 that are executed by microprocessor 504 for identifying whether or not the utility is making a request to read the meter. Thus, for example, prior to interrupter 108 switching to the second state described above, the interrupter checks as to whether the utility is currently reading the meter. If not, interrupter 108 is switched to the second state so that a third-party can read the meter. While interrupter 108 is in the second state, microprocessor 504 repeatedly checks to see if a signal is incoming from the utility requesting to read the meter. If a signal is detected, interrupter 108 immediately switches to the first state to allow the utility to read the meter and then returns to the second state only after the utility has completed its read of the meter. In certain embodiments, interrupter 108 (or flow monitor 112) may monitor the utility's read time so as to know when a read of the meter is possible. In another embodiment, interrupter (or flow monitor 112) may monitor whether the utility is reading the meter at a predefined time interval, e.g., 900 seconds (currently most reads take less than 10 seconds). In this embodiment, the schedule for third-party 120's meter reading is adjusted to avoid future conflicts with the utility's read (this assumes that the utility is reading on a regular schedule).

In an embodiment, interrupter 108 includes a relay operably switchable between two states (as described above). In an embodiment, interrupter 108 includes a receiver for receiving commands or information from, for example, flow monitor 112. In an embodiment, the receiver can be used to operate a switch or relay so as to establish direct electronic communications between either utility flow meter 104 and utility 116 or flow monitor 112. In an embodiment, interrupter 108 includes a transmitter for communicating with, for example, flow monitor 112. In an embodiment, the transmitter can send a "no read" command in the event that the utility is currently reading the utility flow meter or is sending a read request to access data from the utility flow meter so as to indicate to the operator that a read of the utility flow meter was not completed. In an embodiment, interrupter 108 includes a detector for monitoring whether the utility is currently reading the utility flow meter or is sending a read request to access data from the utility flow meter.

Flow monitor 112 is capable of conducting meter readings of the utility flow meter 104, storing the data, providing the data to a third-party for processing, and converting received data signals from one encoded protocol to another, if desired. In an exemplary embodiment, flow monitor 112 allows for on demand data logging from most any existing meter installation, regardless of meter make or size. In a preferred embodiment, flow monitor 112 is compatible with Sensus, Neptune, Badger, Hersey, Elster, Precision, Master Meter, Water Specialties, and other known or to be developed meters, especially those for water and gas metering.

In certain embodiments, flow monitor 112 includes a non-volatile memory, similar to memory 508 (FIG. 5), for continuous recording ranges from, for example, 7.5 days using a 5-second data storage interval to, for example, 3 months using a 60-second data storage interval. In an exemplary embodiment, where there is no permanent power available, flow monitor 112 automatically stops recording or taking reads and powers down when batteries are low to preserve recorded data and avoid battery damage. The flow data obtained via flow monitor 112 is stored in the memory for later downloading and analysis by a third-party. In certain embodiments, flow monitor 112 does not use a memory and therefore substantially instantaneously transmits received data into the desired output that is sent to, for example, a remote user interface, such as remote device 548 (FIG. 5), and/or database, such as storage device 524 (FIG. 5).

Figure 2:
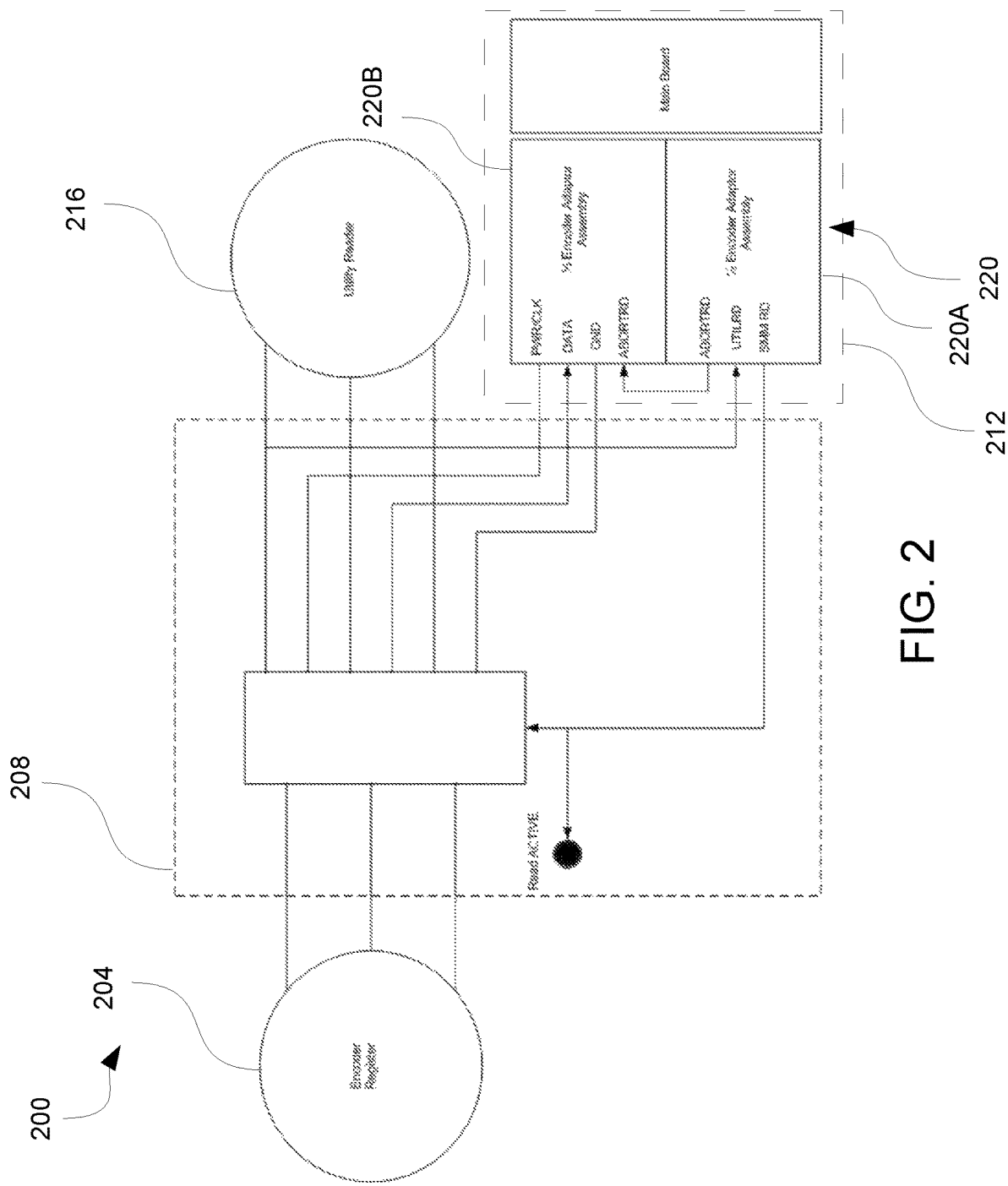
FIG. 2 is another block diagram of an exemplary low interference sub-meter monitoring system according to an embodiment of the present disclosure.

FIG. 2 is another low interference sub-meter monitoring system, system 200, according to an embodiment of the present disclosure. In this embodiment, a utility flow meter 204 is coupled to an interrupter 208 via three communications signals, e.g., a clock signal, a ground signal, and a power signal. These connections continue on to both the utility 216 and the flow monitor 212 (and ultimately a third-party requester). Interrupter 208 can operate in the modes described above with respect to utility flow meter 204. Flow monitor 212 includes two adaptor assemblies 220, e.g., 220A and 220B, which control the operation of flow monitor 212 according to one or more of the processes discussed in more detail below.

It should be understood that flow monitor 212 and interrupter 208 can be combined into a single unit. This may be preferable as a number of components in flow monitor 212 can be used to implement interrupter 208.

Figure 3:
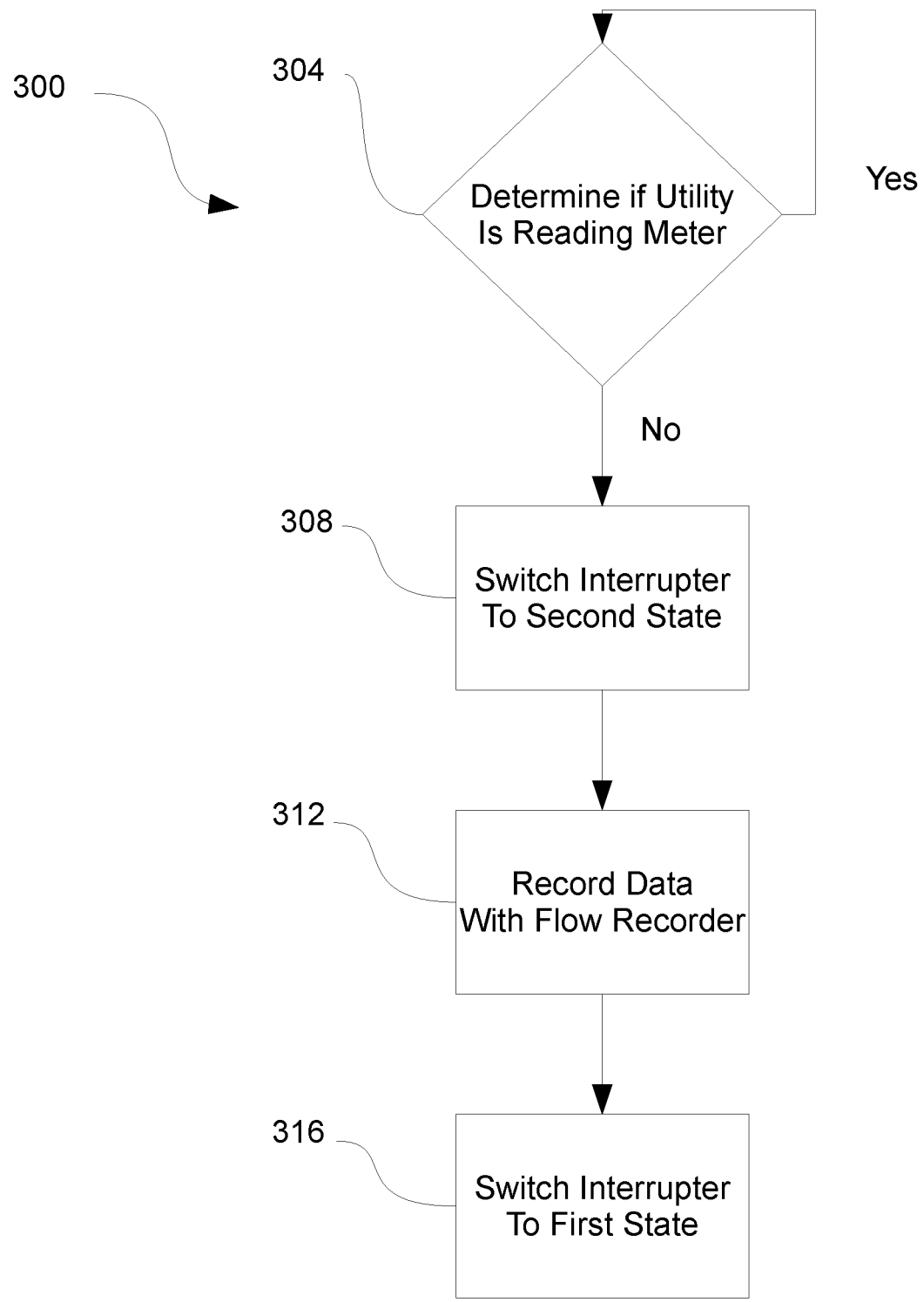
FIG. 3 is a block diagram of an exemplary process for accessing utility type data by a third-party according to an embodiment of the present disclosure.

FIG. 3 shows an exemplary process 300 for low interference monitoring of a utility flow meter, such as a water meter, by a third party. At step 304, a determination is made as to whether the utility is currently reading the utility flow meter. This determination can be made by evaluating whether signals are being sent between the utility flow meter and the utility. Alternatively, an analysis can be completed of the typical time between reads by the utility and this calculation can be used to avoid conflicts with third-party meter reading. In this later scenario, the analysis may need to be done with some regularity as a variety of factors can cause the timing of the utility's reads to change (weather or power interruptions, schedule changes, check-ups, etc.).

If the utility flow meter is currently being read, the process loops to continue to monitor whether the read is still occurring. To conserve battery life of the third-party monitor, a time lag may be implemented, such as 10 seconds, to avoid rapidly repeated monitoring. If the utility flow meter is not being read, the process proceeds to step 308, where an interrupter is switched from the default first state, which connects the utility flow meter directly to the utility, to a second state that allows the third-party monitor to read the utility flow meter. At step 312, the utility flow meter is read by a flow monitor, such as flow monitor 112. At step 316, when the read is complete, the interrupter is switched back to the first state to avoid interruptions to the utility's ability to read the utility flow meter. In the first state, the utility's ability to read the meter is not compromised or impaired even if the interrupter 108 or flow monitor 112 are powered off or inoperable for any reason, except in the rare instance in which damage is so extensive as to prevent the direct connection between the utility flow meter and the utility.

Figure 4:
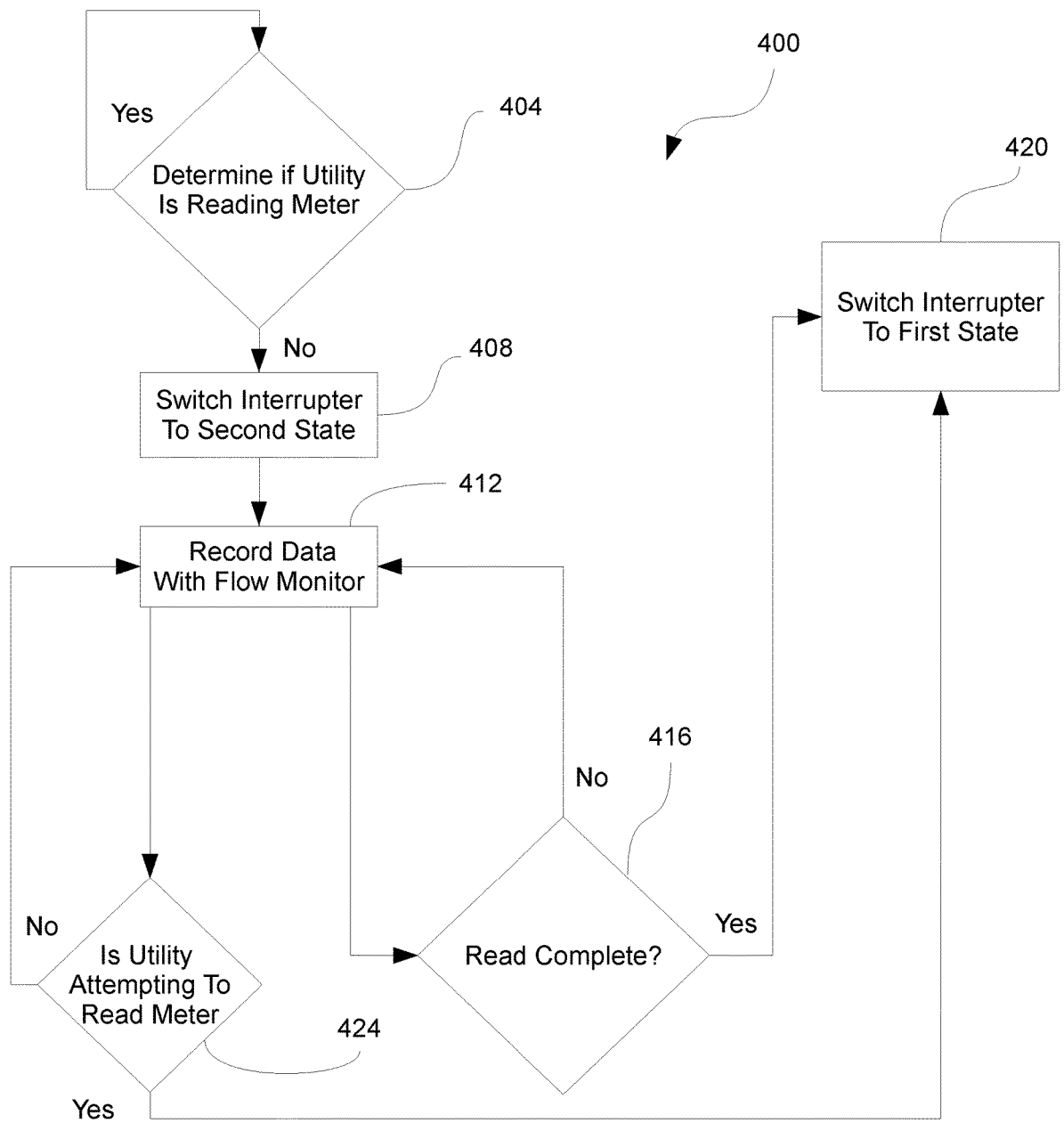
FIG. 4 is a block diagram of an exemplary process for accessing utility type data by a third-party according to another embodiment of the present disclosure.

FIG. 4 shows a process 400 for reading a utility flow meter by a third-party via a flow monitor.

At step 404, a determination is made as to whether the utility is currently reading the utility flow meter. This determination can be made by evaluating whether signals are being sent between the utility flow meter and the utility. Alternatively, an analysis can be completed of the typical time between reads by the utility and this calculation can be used to avoid conflicts with third-party utility flow meter reading. In this later scenario, the analysis may need to be done with some regularity as a variety of factors can cause the timing of the utility's reads to change (weather or power interruptions, schedule changes, check-ups, etc.).

If the utility flow meter is currently being read, the process loops to continue to monitor whether the read is still occurring. To conserve battery life of the third-party monitor, a time lag may be implemented, such as 10 seconds, to avoid rapid repeated monitoring. If the utility flow meter is not being read, the process proceeds to step 408 where an interrupter is switched from the default first state, which directly connects the utility flow meter directly to the utility, to a second state that allows the third-party monitor to read the utility flow meter. At step 412, a flow monitor, such as flow monitor 112 or flow monitor 212, reads the utility flow meter.

Steps 416 and 424, in this embodiment, take place substantially simultaneously. At step 416, a determination is made as to whether the read is complete. In general, reads take a few seconds, but even within those few seconds a conflict with a utility read can occur. If the read is complete, the process proceeds to step 420, where the interrupter is switched to the first state and the flow monitor waits to initiate its next read (effectively returning to step 404). If the read is not complete, the process returns to step 412.

At step 424, whether the utility is attempting to read the meter is determined. In an embodiment, a communication channel coming from the utility is constantly monitored for a read request. If a read request by the utility is detected, the process proceeds to step 420 where the interrupter is switched back to the first state to avoid interruptions to the utility's ability to read the utility flow meter. If no read request is detected, utility flow meter data continues to be recorded (returns to step 412).

If process 400 proceeds to step 420, the process can start over so as to determine when the third-party utility flow meter read can resume/restart. In certain embodiments of process 400, rather than attempting to resume or restart via step 404, process 400 can skip the then current read of the utility flow meter and then average the next meter read with the read prior to the missed meter read. Process 400 is typically performed at pre-programmed intervals which can range in duration.

FIG. 5 shows a diagrammatic representation of one embodiment of a computing device in the exemplary form of a system 500 within which a set of instructions for causing a device, such as interrupter 108 or flow monitor 112, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. System 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 516 (Bios), including basic routines that help to transfer information between elements within system 500, such as during start-up, may be stored in memory 508.

Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

System 500 may also include a storage device 524. Examples of a storage device include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 524 (or one or more components thereof) may be removably interfaced with system 500 (e.g., via an external port connector (not shown)). Particularly, storage device 524 and an associated machine-readable medium 528 may provide non-volatile and/or volatile storage of machine-readable instructions, data structures, program modules, and/or other data for system 500. In one example, instructions 520 may reside, completely or partially, within machine-readable medium 528. In another example, instructions 520 may reside, completely or partially, within processor 504.

System 500 may also include an input device 532. In one example, a user of system 500 may enter commands and/or other information into system 500 via input device 532. Examples of an input device 532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device 532 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 532 may include a touch screen interface that may be a part of or separate from display 536, discussed further below. Input device 532 may be utilized as a user selection device for selecting one or more graphical representations in a graphical interface as described above. Input device 532 may also include, signal or information generating devices, such as interrupter 108 or flow monitor 112. The output of the input devices can be stored, for example, in storage device 524 and can be further processed by processor 504.

A user may also input commands and/or other information to system 500 via storage device 524 (e.g., a removable disk drive, a flash drive, etc.) and/or network interface device 540. A network interface device, such as network interface device 540 may be utilized for connecting system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, instructions 520, etc.) may be communicated to and/or from system 500 via network interface device 540.

System 500 may further include a video display adapter 552 for communicating a displayable image to a display device, such as display device 536. Examples of a display device include, but are not limited to, a liquid crystal display (LCD), a cathode ray tube (CRT), a plasma display, a light emitting diode (LED) display, and any combinations thereof. Display adapter 552 and display device 536 may be utilized in combination with processor 504 to provide a graphical representation of a utility resource, a location of a land parcel, and/or a location of an easement to a user. In addition to a display device, a system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A sub-meter monitoring system for a utility flow meter connected to a utility via a utility meter interface, comprising:
   a flow monitor that receives data from the utility flow meter, and
   an interrupter in electronic communication with the utility flow meter, the utility meter interface, and the flow monitor, wherein the interrupter operable to move between a first state and a second state, wherein the first state directly connects the utility flow meter with the utility meter interface and wherein the second state electronically couples the utility flow meter directly with the flow monitor, and wherein the interrupter is in the first state unless there is a read request to move the interrupter to the second state and wherein moving the interrupter to the second state only occurs if the utility is not reading the utility flow meter; and
   wherein the flow monitor is configured to monitor whether the read request is coming from the utility and to operate the interrupter such that:
   if the utility is reading the utility flow meter, the interrupter remains in the first state, and
   if the utility is not reading the utility flow meter, the interrupter is switched to the second state so as to allow the flow monitor to read the utility flow meter, and after the flow monitor's reading of the utility flow meter is complete, the interrupter is switched back to the first state.

2. The sub-meter monitoring system according to claim 1, wherein when the interrupter is in the second state, the flow monitor monitors whether the read request is made by the utility.

3. The sub-meter monitoring system according to claim 2, wherein if the flow monitor detects that the utility is making the read request, the interrupter is switched to the first state.

4. The sub-meter monitoring system according to claim 3, wherein the flow monitor detects when the utility has completed reading the utility flow meter.

5. The sub-meter monitoring system according to claim 3, wherein the flow monitor pauses for a predetermined amount of time before determining whether the utility has completed reading the utility flow meter.

6. The sub-meter monitoring system according to claim 1, wherein if the flow monitor becomes disabled, the interrupter reverts to the first state.

7. The sub-meter monitoring system according to claim 1, wherein the flow monitor includes a memory.

8. The sub-meter monitoring system according to claim 1, wherein the flow monitor includes a user interface.

9. The sub-meter monitoring system according to claim 1, wherein when the interrupter is in the second state, the flow monitor does not monitor whether the read request is made by the utility.

10. An interrupter for a sub-meter monitoring system, the sub-meter monitoring system including a flow monitor capable of receiving data from a utility flow meter connected to a utility via a utility meter interface, the interrupter comprising:
    a receiver in electronic communication with the flow monitor;
    a switch in electronic communication with the receiver, the switch being operable to change between a first state and a second state, wherein the first state directly connects the utility flow meter with the utility meter interface wait and wherein the second state electronically couples the utility flow meter with the flow monitor;
    wherein the receiver is configured to:
    receive a read request from the flow monitor; and
    alter the switch from the first state to the second state based upon the read request so as to electronically couple the utility flow meter with the flow monitor,
    wherein the switch is in the first state unless the receiver receives the read request to move the switch to the second state and wherein moving the switch to the second state only occurs if the utility is not reading the utility flow meter; and
    wherein the flow monitor is configured to monitor whether the read request is coming from the utility and to operate the interrupter such that:
    if the utility is reading the utility flow meter, the interrupter remains in the first state, and
    if the utility is not reading the utility flow meter, the interrupter is switched to the second state so as to allow the flow monitor to read the utility flow meter, and after the flow monitor's reading of the utility flow meter is complete, the interrupter is switched back to the first state.

11. The interrupter according to claim 10, wherein the interrupter further includes a transmitter, the transmitter in electronic communication with the flow monitor.

12. The interrupter according to claim 11, wherein the interrupter further includes a detector, the detector capable of monitoring data requests coming from the utility.

13. The interrupter according to claim 12, wherein, if the detector determines that the utility is reading the utility flow meter when the read request from the flow monitor is received by the receiver, the receiver does not alter the switch from the first state to the second state.

14. The interrupter according to claim 13, wherein the flow monitor waits a predetermined amount of time to send another read request to the receiver.

15. The interrupter according to claim 13, wherein the transmitter communicates a no read command to the flow monitor.

16. The interrupter according to claim 10, wherein the receiver receives a read complete command from the flow monitor and alters the switch from the second state to the first state based upon the read complete command so as to directly connect the utility flow meter with the utility meter interface.

17. A method of reading a utility flow meter connected to a utility via a utility meter interface, by a third-party flow monitor comprising:
sending a data request to an interrupter, wherein the third-party flow monitor that receives data from the utility flow meter, and the interrupter in electronic communication with the utility flow meter, the utility meter interface, and the third-party flow monitor, wherein the interrupter operable to move between a first state and a second state, wherein the first state directly connects the utility flow meter with the utility meter interface and wherein the second state electronically couples the utility flow meter directly with the third-party flow monitor, and wherein the interrupter is in the first state unless there is the data request to move the interrupter to the second state and wherein moving the interrupter to the second state only occurs if the utility is not reading the utility flow meter; and wherein the third-party flow monitor is configured to monitor whether the data request is coming from the utility and to operate the interrupter such that: if the utility is reading the utility flow meter, the interrupter remains in the first state, and if the utility is not reading the utility flow meter, the interrupter is switched to the second state so as to allow the third-party flow monitor to read the utility flow meter and after the flow monitor's reading of the utility flow meter is complete, the interrupter is switched back to the first state;
determining whether the utility is reading the utility flow meter;
switching the interrupter from the first state to the second state if the utility is not reading the utility flow meter thereby allowing for electronic communications between the utility flow meter and the third-party flow monitor; and receiving the data, the data representative of a liquid flow volume and/or rate, from the utility flow meter.

18. The method according to claim 17, further including, prior to the step of switching:
determining whether the utility is reading the utility flow meter; and
if the utility is reading the utility flow meter, resending the data request to the interrupter after a predetermined amount of time.

19. A method according to claim 17, further including monitoring whether the utility is sending a read request.

20. The method according to claim 19, further including returning the interrupter from the second state to the first state thereby directly connecting the utility flow meter and the utility meter interface.

21. The method according to claim 20, further including determining when the utility has completed the reading of the utility flow meter and returning the interrupter from the first state to the second state thereby allowing for electronic communications between the utility flow meter and the third-party flow monitor.

22. A sub-meter monitoring system for a utility flow meter operated by a utility, the utility electronically connected to the utility flow meter via a utility meter interface, comprising:
a flow monitor that receives data from the utility flow meter, and
an interrupter in electronic communication with the utility flow meter, the utility, and the flow monitor, wherein the interrupter operable to move between a first state and a second state, wherein the first state directly connects the utility flow meter with the utility meter interface and wherein the second state electronically couples the utility flow meter directly with the flow monitor, wherein the interrupter is in the first state unless a read request is sent by the flow monitor to move the interrupter to the second state wherein moving the interrupter to the second state only occurs if the utility is not reading the utility flow meter and wherein the interrupter returns to the first state after the flow monitor reads the utility flow meter;
wherein the flow monitor is configured to monitor whether the read request is coming from the utility meter interface and to operate the interrupter such that:
if the utility is reading the utility flow meter, the interrupter remains in the first state, and if the utility is not reading the utility flow meter, the interrupter is switched to the second state so as to allow the flow monitor to read the utility flow meter and after the flow monitor's reading of the utility flow meter is complete, the interrupter is switched back to the first state.

* * * * *